US010891507B2

(12) United States Patent
Huang et al.

(10) Patent No.: US 10,891,507 B2
(45) Date of Patent: Jan. 12, 2021

(54) METHOD AND DEVICE FOR RECOGNIZING IDENTITY

(71) Applicant: BEIJING 7INVENSUN TECHNOLOGY CO., LTD., Beijing (CN)

(72) Inventors: Tongbing Huang, Beijing (CN); Linchan Qin, Beijing (CN)

(73) Assignee: BEIJING 7INVENSUN TECHNOLOGY CO., LTD., Beijing (CN)

(*) Notice: Subject to any disclaimer, the term of this patent is extended or adjusted under 35 U.S.C. 154(b) by 111 days.

(21) Appl. No.: 16/312,301

(22) PCT Filed: Jun. 30, 2017

(86) PCT No.: PCT/CN2017/091264
§ 371 (c)(1),
(2) Date: Dec. 21, 2018

(87) PCT Pub. No.: WO2018/001371
PCT Pub. Date: Jan. 4, 2018

(65) Prior Publication Data
US 2019/0205681 A1 Jul. 4, 2019

(30) Foreign Application Priority Data
Jun. 30, 2016 (CN) .......................... 2016 1 0509755

(51) Int. Cl.
G06K 9/00 (2006.01)
G06T 7/246 (2017.01)
G06T 7/73 (2017.01)

(52) U.S. Cl.
CPC .......... *G06K 9/00906* (2013.01); *G06K 9/00* (2013.01); *G06K 9/0061* (2013.01);
(Continued)

(58) Field of Classification Search
CPC .... G06K 9/00906; G06K 9/00; G06K 9/0061; G06K 9/00617; G06K 9/00912; G06T 7/246; G06T 7/73; G06T 2207/30201
See application file for complete search history.

(56) References Cited

U.S. PATENT DOCUMENTS 10,488,923 B1* 11/2019 Chen .................... G06K 9/0061
10,546,183 B2* 1/2020 Rodriguez ......... G06K 9/00906
(Continued)

FOREIGN PATENT DOCUMENTS

CN 1299103 A 6/2001
CN 1924892 A 3/2007
(Continued)

OTHER PUBLICATIONS

Abhyankar, A. et al., "Characterization, similarity score and uniqueness associated with perspiration pattern", International Conference on Audio-and Video-Based Biometric Person Authentication (AVBPA 2005), published 2005 <URL: http://citeseerx.ist.psu.edu/viewdoc/download?doi=10.1.1.514.8192&rep=rep1&type=pdf>.
(Continued)

*Primary Examiner* — Utpal D Shah
(74) *Attorney, Agent, or Firm* — Gang Yu

(57) ABSTRACT

The invention provides an identity recognition method and device. The method includes that: an eye image when a user to be recognized looks at a target point position is acquired; identity recognition is performed on the user to be recognized according to the eye image and a preestablished user identity information database; and living body detection is performed on the user to be recognized according to the eye image, a coordinate of the target point position, the user identity information database and an identity recognition result.

14 Claims, 1 Drawing Sheet

(52) U.S. Cl.
CPC ..... *G06K 9/00617* (2013.01); *G06K 9/00912* (2013.01); *G06T 7/246* (2017.01); *G06T 7/73* (2017.01); *G06T 2207/30201* (2013.01)

(56) References Cited

U.S. PATENT DOCUMENTS

| | | | |
|---|---|---|---|
| 10,678,897 B2 * | 6/2020 | Skogo | .............. G06F 3/013 |
| 2010/0202667 A1 | 8/2010 | Ren et al. | |
| 2010/0299530 A1 | 11/2010 | Bell | |
| 2013/0336547 A1 * | 12/2013 | Komogortsev | ........ A61B 5/117 |
| | | | 382/117 |
| 2016/0307038 A1 * | 10/2016 | Skogo | .............. G06F 21/316 |

FOREIGN PATENT DOCUMENTS

| | | |
|---|---|---|
| CN | 101710383 A | 5/2010 |
| CN | 101727574 A | 6/2010 |
| CN | 101833646 A | 9/2010 |
| CN | 105139006 A | 12/2015 |
| CN | 105184246 A | 12/2015 |
| CN | 105184277 A | 12/2015 |
| CN | 105354473 A | 2/2016 |
| CN | 105550625 A | 5/2016 |
| CN | 106203297 A | 12/2016 |
| JP | 2006085226 A | 3/2006 |
| JP | 2015013031 A | 1/2015 |
| WO | 2016076912 A1 | 5/2016 |
| WO | 2016059786 A1 | 8/2017 |

OTHER PUBLICATIONS

AU second Office Action dated Apr. 21, 2020 re: Application No. 2017287619, pp. 1-5.
Supplemental EP Search Report dated Jul. 16, 2019 re: Application No. 17819367.8, pp. 1-11.
Dobromir Todorov: "Excerpt" in: "Mechanics of User identification and Authentication: Fundamentals of Identity Magagement", Jan. 1, 2007 (Jan. 1, 2007), CRC Press, XP055602911, ISBN: 978-1-4200-5220-6, pp. 35-36.
Anil K. Jain et al:"Excerpt" in: "Handbook of Biometrics.", Jan. 1, 2008 (Jan. 1, 2008), Springer Science + Business., New York, US 034537, XP055602963, ISBN: 978-0-387-71040-2; pp. 410-411.
Komogortsev Oleg V et al: "Attack of Mechanical Replicas: Liveness Detection With Eye Movements", IEEE Transactions on Information Forensics and Security, IEEE, Piscataway, NJ, US, vol. 10, No. 4, Apr. 1, 2015 (Apr. 1, 2015), pp. 716-715, XP011575419, ISSN: 1556-6013, DOI: 101109/TIFS. 2015.2405345.
International Search Report for PCT application No. PCT/CN2017/091264 filed on Jun. 30, 2017,dated Sep. 6, 2017.
Naoyuki Aoyama et al. "A Proposal of User Authentication using Convergence Reflex and Eyeball Shape". IEICE Technical Report. vol. 107 No. 140. ISEC2007-16-44. The Institute of Electronics, Information and Communication Engineers. Jul. 12, 2007 (Jul. 12, 2007). vol. 107 No. 140. pp. 185-191. ISSN 0913-5685.
JP first Office Action dated Dec. 24, 2019 re: Application No. 2018-565013, pp. 1-4.
USPTO Office Action re U.S. Appl. No. 15/131,542 dated Aug. 25, 2017.†

* cited by examiner
† cited by third party

METHOD AND DEVICE FOR RECOGNIZING IDENTITY

TECHNICAL FIELD

The embodiments of the disclosure relate to the technical field of identity recognition, and particularly to a method and device for recognizing identity.

BACKGROUND

An iris is a circular part between a black pupil and a white pore membrane and is formed in a fetal development stage. Everyone has a different iris structure which will 1o hardly change in life, so that iris is widely applied to identity recognition in various environments. However, counterfeiting irises are usually adhered to eyes for deception. Therefore, it is necessary to detect whether an iris is a living body or not when the iris is adopted for identity recognition.

In a related art, optical devices are mostly added. A light source irradiates an eye to obtain a sequence for reaction of an iris and an eyeball under optical excitation, for example, stimulating pupil dilation and contraction and light reflection imaging, the obtained sequence is compared with a preset reaction sequence threshold value and whether an object is a living body or not is judged according to whether the obtained sequence is within the threshold value or not.

However, in a living body judgment manner in the related art, pupil dilation and contraction under optical excitation is also influenced by moods, colors, external light sources, individual differences and the like, which makes it likely to make a misjudgment. It is unlikely to ensure adaptability of the preset reaction sequence threshold value. Moreover, it is easy for a method of adhering an iris to the eye to fool the optical device and thus both of adaptability and anti-counterfeiting performance are poor.

SUMMARY

In view of this, the embodiments of the disclosure are intended to provide a method and device for recognizing identity, to solve the problems in the related art that it is likely to make a misjudgment when an optical-excitation-based living body judgment manner is adopted and both of adaptability and anti-counterfeiting performance are poor.

On a first aspect, the embodiments of the disclosure provide a method for recognizing identity, which includes that:

an eye image when a user to be recognized looks at a target point position is acquired;

identity recognition is performed on the user to be recognized according to the eye image and a preestablished user identity information database; and living body detection is performed on the user to be recognized according to the eye image, a coordinate of the target point position, the user identity information database and an identity recognition result.

In combination with the first aspect, the embodiments of the disclosure provide a first possible implementation mode of the first aspect, and the operation that identity recognition is performed on the user to be recognized according to the eye image and the preestablished user identity information database includes that:

an eye feature is extracted from the eye image, the eye feature including an iris feature and an eye movement feature;

whether the user identity information database includes the iris feature is judged; and if the user identity information database includes the iris feature, identity information and calibration data corresponding to the iris feature are acquired from the user identity information database.

In combination with the first possible implementation mode of the first aspect, the embodiments of the disclosure provide a second possible implementation mode of the first aspect, and the operation that living body detection is performed on the user to be recognized according to the eye image, the coordinate of the target point position, the user identity information database and the identity recognition result includes that:

when the identity recognition result indicates that the user identity information database includes the iris feature, a theoretical fixation point coordinate of the user to be recognized is calculated according to the eye movement feature and the acquired calibration data; and the theoretical fixation point coordinate is compared with the coordinate of the target point position to judge whether the user to be recognized is a living user.

In combination with the first possible implementation mode of the first aspect, the embodiments of the disclosure provide a third possible implementation mode of the first aspect, and the operation that living body detection is performed on the user to be recognized according to the eye image, the coordinate of the target point position, the user identity information database and the identity recognition result includes that:

when the identity recognition result indicates that the user identity information database includes the iris feature, calibration data of the user to be recognized is calculated according to the eye movement feature and the coordinate of the target point position; and the calibration data of the user to be recognized is compared with the acquired calibration data to judge whether the user to be recognized is a living user.

In combination with the first possible implementation mode of the first aspect, the embodiments of the disclosure provide a fourth possible implementation mode of the first aspect, and the operation that living body detection is performed on the user to be recognized according to the eye image, the coordinate of the target point position, the user identity information database and the identity recognition result includes that:

when the identity recognition result indicates that the user identity information database includes the iris feature, calibration data of each user is called from the user identity information database;

theoretical fixation point coordinates are calculated according to the eye movement feature and the called calibration data of each user; and the theoretical fixation point coordinates are compared with the coordinate of the target point position respectively to judge whether the user to be recognized is a living user.

In combination with the first aspect, the embodiments of the disclosure provide a fifth possible implementation mode of the first aspect, and before the operation that the eye image when the user to be recognized looks at the target point position is acquired, the method further includes that:

target point positions are randomly generated on a display screen according to a time sequence, one target point position being displayed on the display screen at every moment and the target point positions being random;

or, the target point positions are generated on the display screen according to the time sequence and a preset position sequence, one target point position being displayed on the display screen at every moment and the target point positions being set according to the preset position sequence.

On a second aspect, the embodiments of the disclosure provide an device for recognizing identity, which includes:

an acquisition module, configured to acquire an eye image when a user to be recognized looks at a target point position;

an identity recognition module, configured to perform identity recognition on the user to be recognized according to the eye image and a preestablished user identity information database; and a living body detection module, configured to perform living body detection on the user to be recognized according to the eye image, a coordinate of the target point position, the user identity information database and an identity recognition result.

In combination with the second aspect, the embodiments of the disclosure provide a first possible implementation mode of the second aspect, and the identity recognition module includes:

an extraction module, configured to extract an eye feature from the eye image, the eye feature including an iris feature and an eye movement feature;

a first judgment unit, configured to judge whether the user identity information database includes the iris feature; and an acquisition unit, configured to, under the condition that the user identity information database includes the iris feature, acquire identity information and calibration data corresponding to the iris feature from the user identity information database.

In combination with the first possible implementation mode of the second aspect, the embodiments of the disclosure provide a second possible implementation mode of the second aspect, and the living body detection module includes:

a calculation unit, configured to, when the identity recognition result indicates that the user identity information database includes the iris feature, calculate a theoretical fixation point coordinate of the user to be recognized according to the eye movement feature and the acquired calibration data; and a second judgment unit, configured to compare the theoretical fixation point coordinate with the coordinate of the target point position to judge whether the user to be recognized is a living user.

In combination with the first possible implementation mode of the second aspect, the embodiments of the disclosure provide a third possible implementation mode of the second aspect, and the living body detection module includes:

the calculation unit, configured to, when the identity recognition result indicates that the user identity information database includes the iris feature, calculate calibration data of the user to be recognized according to the eye movement feature and the coordinate of the target point position; and the second judgment unit, configured to compare the calibration data of the user to be recognized with the acquired calibration data to judge whether the user to be recognized is a living user.

In combination with the first possible implementation mode of the second aspect, the embodiments of the disclosure provide a fourth possible implementation mode of the second aspect, and the living body detection module includes:

the calculation unit, configured to, when the identity recognition result indicates that the user identity information database includes the iris feature, call calibration data of each user from the user identity information database and calculate theoretical fixation point coordinates according to the eye movement feature and the called calibration data of each user; and the second judgment unit, configured to compare the theoretical fixation point coordinates with the coordinate of the target point position respectively to judge whether the user to be recognized is a living user.

In combination with the second aspect, the embodiments of the disclosure provide a fifth possible implementation mode of the second aspect, and the device further includes:

a first generation module, configured to randomly generate target point positions on a display screen according to a time sequence, one target point position being displayed on the display screen at every moment and the target point positions being random;

or, a second generation module, configured to generate the target point positions on the display screen according to the time sequence and a preset position sequence, one target point position being displayed on the display screen at every moment and the target point positions being set according to the preset position sequence.

On a third aspect, the embodiments of the disclosure provide a storage medium, which includes a stored program, the program running to control a device where the storage medium is located to execute the abovementioned method for recognizing identity.

On a fourth aspect, the embodiments of the disclosure provide a processor, which is configured to run a program, the program running to execute the abovementioned method for recognizing identity.

On a fifth aspect, the embodiments of the disclosure provide a terminal, which includes: an acquisition module, configured to acquire an eye image when a user to be recognized looks at a target point position; an identity recognition module, configured to perform identity recognition on the user to be recognized according to the eye image and a preestablished user identity information database; a living body detection module, configured to perform living body detection on the user to be recognized according to the eye image, a coordinate of the target point position, the user identity information database and an identity recognition result; and a processor, running a program, the program running to execute the abovementioned method for recognizing identity for data output from the acquisition module, the identity recognition module and the living body detection module.

On a sixth aspect, the embodiments of the disclosure provide a terminal, which includes: an acquisition module, configured to acquire an eye image when a user to be recognized looks at a target point position; an identity recognition module, configured to perform identity recognition on the user to be recognized according to the eye image and a preestablished user identity information database; a living body detection module, configured to perform living body detection on the user to be recognized according to the eye image, a coordinate of the target point position, the user identity information database and an identity recognition result; and a storage medium, configured to store a program, the program running to execute the abovementioned method for recognizing identity for data output from the acquisition module, the identity recognition module and the living body detection module.

According to the method for recognizing identity and device provided in the embodiments of the disclosure, the eye image when the user to be recognized looks at the target point position is acquired; identity recognition is performed on the user to be recognized according to the eye image and the preestablished user identity information database; and living body detection is performed on the user to be recognized according to the eye image, the coordinate of the target point position, the user identity information database and the identity recognition result. In the embodiments of the disclosure, an eye movement tracking technology is combined with an identity recognition technology, and identity recognition over the user to be recognized succeeds only when living body detection and identity recognition over the user to be recognized both succeed, so that identity recognition accuracy is high and both of adaptability and anti-counterfeiting performance are high.

For making the purposes, features and advantages of the disclosure apparent and easy to understand, detailed descriptions will be made below through preferred embodiments in combination with the appended drawings.

BRIEF DESCRIPTION OF THE DRAWINGS

In order to describe the technical solutions of the embodiments of the disclosure more clearly, the drawings required to be used for the embodiments will be simply introduced below. It is to be understood that the following drawings only illustrate some embodiments of the disclosure and thus should not be considered as limits to the scope. Those of ordinary skill in the art may further obtain other related drawings according to these drawings without creative work.

DETAILED DESCRIPTION OF THE EMBODIMENTS

Figure 1:
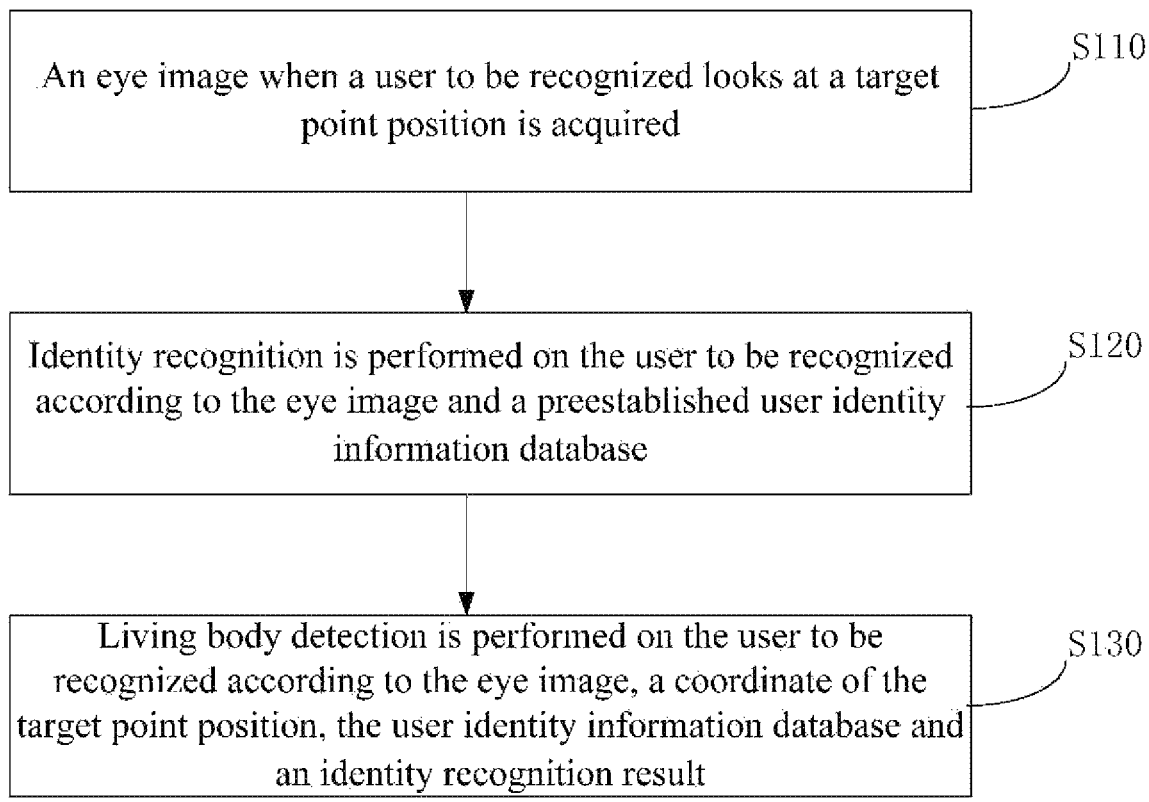
FIG. 1 is a flowchart of a method for recognizing identity according to embodiment 1 of the disclosure.

For making the purposes, technical solutions and advantages of the embodiments of the disclosure clearer, the technical solutions in the embodiments of the disclosure will be clearly and completely described below in combination with the drawings in the embodiments of the disclosure. It is apparent that the described embodiments are not all embodiments but only part of embodiments of the disclosure. Components, described and shown in the drawings herein, of the embodiments of the disclosure may usually be arranged and designed according to various configurations. Therefore, the following detailed descriptions about the embodiments, provided in the drawings, of the disclosure are not intended to limit the claimed scope of the disclosure and only represent selected embodiments of the disclosure. All other embodiments obtained by those skilled in the art on the basis of the embodiments of the disclosure without creative work shall fall within the scope of protection of the disclosure.

Whether an iris is a living body or not is mostly judged in an optical excitation manner when the iris is adopted for identity recognition in the related art. However, pupil dilation and contraction under optical excitation is also influenced by moods, colors, external light sources, individual differences and the like, which makes it likely to make a misjudgment. It is unlikely to ensure adaptability of a preset reaction sequence threshold value. Moreover, it is easy for a method of adhering an iris to the eye to fool an optical device and thus both of adaptability and anti-counterfeiting performance are poor. On such a basis, the embodiments of the disclosure provide a method for recognizing identity and device. Descriptions will be made below through embodiments.

Embodiment 1

The embodiment of the disclosure provides a method for recognizing identity. According to the method, an eye movement tracking technology is combined with an iris recognition technology. By the eye movement tracking technology, an eye image when a user to be recognized looks at a target point position is acquired, an iris feature and eye movement feature of the user to be recognized are extracted, iris recognition is performed on the user to be recognized, calibration data is called, whether the user to be recognized is a living user is judged in combination with a coordinate of the target point position and, when iris recognition over the user to be recognized succeeds and it is determined that the user to be recognized is a living user, it is determined that identity recognition over the user to be recognized succeeds. The method for recognizing identity provided in the embodiment of the disclosure is high in identity recognition accuracy and high in both of adaptability and anti-counterfeiting performance.

The method for recognizing identity provided in the embodiment of the disclosure may be applied to scenarios of access control of a bank, access control of a prison, payment with a password and the like. Before the method provided in the embodiment of the disclosure is adopted for identity recognition, an identity information database of licensed users of an application scenario is required to be established. For example, if the method for recognizing identity is applied to access control of the bank, an identity information database of employees of the bank is required to be established to perform identity recognition on the employees of the bank, and when the employees of the bank pass identity recognition, a door of the bank is opened and the employees can enter. If the method for recognizing identity is applied to access control of the prison, an identity information database of prison officers is required to be established.

Establishment of the user identity information database specifically includes the following steps: iris features and calibration data of users and identity information of the users are acquired; and the iris features, calibration data and identity information of the users and correspondences thereof are stored in the user identity information database.

The iris features include features of specks, filaments, coronae, stripes, recesses and the like of irises of the users. The calibration data is individual user feature data calculated according to eye movement features when the users look at one or more groups of specific target point positions and coordinates of fixation points.

The specific target point positions may be five target point positions displayed in four corners and center of a display screen and may also be nine target point positions displayed in the four corners on the display screen, centers of four sides and the center of the display screen. The specific target point positions are recorded as calibration point positions. Of course, the calibration point positions may also be target point positions at other positions on the display screen. The number and positions of the group of calibration point positions may be set according to a practical application scenario.

A process of acquiring the iris features and calibration data of the users includes the following operations.

The calibration point positions are continuously generated on the display screen according to a time sequence, one calibration point position being displayed every time, calibration eye images when the users look at the calibration point positions with eyes are acquired and the iris features and eye movement features of the users are extracted from the acquired calibration eye images. The iris features of the users include, but not limited to, the features of the specks, the filaments, coronae, the stripes, the recesses and the like. The eye movement features are eye features acquired when the users look at the calibration point positions and include, but not limited to, eye features of eye corners, pupil central positions, pupil radiuses, Purkinje images formed by corneal emission and the like of the users. The calibration data of the users is calculated according to the eye movement features when the users look at the one or more groups of calibration point positions and calibration point position information, the calibration data including, but not limited to, eye feature data of included angles of visual axes of the users and an optical axis and the like. After the iris features and the calibration data are acquired, the identity information of the users is acquired, the identity information including, but not limited to, information of names, identity numbers, sexes, positions and the like of the users. The correspondences among the identity information, iris features and calibration data of the users are established and the identity information, iris features and calibration information of the users and the correspondences thereof are stored in the user identity information database.

When the method provided in the embodiment of the disclosure is adopted for identity recognition over the user to be recognized, the user to be recognized is required to look at the target point position. The target point position may be a series of target point positions displayed on the display screen, may also be a target point position displayed at a certain fixed point, for example, on a wall and on a glass door, and may further be an object at a certain position.

The target point position is displayed on the display screen and a virtual keyboard may also be displayed. The virtual keyboard may be a numeric keyboard formed by ten numbers 0-9, may also be an alphabetical keyboard formed by the 26 English letters or may further be a combined numeric-alphabetical keyboard formed by the ten numbers 0-9 and the 26 English letters. The letters or numbers on the virtual keyboard are in a random sequence. The user to be recognized may input a predetermined password in a manner of looking at key positions on the virtual keyboard. For example, if the predetermined password is 123, the user to be recognized looks at number key positions 123 on the virtual keyboard according to an indication or the user to be recognized may also look at a certain key position on the virtual keyboard according to the indication. For example, the user to be recognized is indicated to look at number key positions 3, 6 and 9 or letter key positions P, M, V and the like on the virtual keyboard according to a sequence. The user may be indicated in a voice form to look at the letters or numbers on the virtual keyboard and the letters or numbers the user is required to look at on the virtual keyboard may also be displayed on the display screen.

Some figures may also be displayed on the display screen and the user to be recognized looks at some parts of the figures on the display screen according to the indication.

If the target point position the user to be recognized looks at is a target point position displayed on the display screen, the target point position is required to e generated on the display screen. For the target point position generated on the display screen, the following two conditions exist. Target point positions are randomly generated on the display screen according to the time sequence, one target point position being displayed on the display screen at every moment and the target point position being random. Or, the target point positions are generated on the display screen according to the time sequence and a preset position sequence, one target point position being displayed on the display screen at every moment and the target point positions being set according to the preset position sequence.

The preset position sequence includes multiple preset position sequences. Every time when identity recognition is performed on the user to be recognized, a position sequence is randomly selected and the target point position is generated at a corresponding position on the display screen according to the randomly selected position sequence.

The method for recognizing identity provided in the embodiment of the disclosure is adopted to perform identity recognition on the user to be recognized and, as shown in FIG. 1, specifically includes steps S110-S130.

In S110, an eye image when a user to be recognized looks at a target point position is acquired.

When identity recognition is required to be performed on the user to be recognized in a scenario of access control of a company, access control of a community or payment with a password, the user to be recognized may click a start button for identity recognition over the user to be recognized. Or when eyes of the user to be recognized enter an image acquisition coverage area, identity recognition is automatically performed on the user to be recognized.

When the user to be recognized looks at the target point position, the eye image of the user may be acquired at a certain frame rate. In such case, multiple eye images may be acquired when the user to be recognized looks at a target point position.

After the eye image when the user to be recognized looks at the target point position is acquired, whether the acquired eye image includes an eye region of the user to be recognized or not is judged at first. If the acquired eye image does not include the eye region of the user to be recognized, eyes of the user to be recognized may not be aligned with an image acquisition device. In such case, the user to be recognized is prompted to regulate a position to reacquire an image. If the acquired eye image includes the eye region of the user to be recognized, identity recognition is performed on the user to be recognized.

In case of unsharpness and the like, caused by factors of interference and the like, of the acquired eye image, the acquired eye image may be used after being processed by methods of interference suppression and the like.

In S120, identity recognition is performed on the user to be recognized according to the eye image and a preestablished user identity information database.

A process of performing identity recognition on the user to be recognized is actually a process of performing iris recognition on the user to be recognized.

The operation that identity recognition is performed on the user to be recognized specifically includes the following process: an eye feature is extracted from the eye image, the eye feature including an iris feature and an eye movement feature; whether the user identity information database includes the iris feature is judged; and if YES, identity information and calibration data corresponding to the iris feature are acquired from the user identity information database.

Since the eye image when the user to be recognized looks at the target point position has been acquired, the eye movement feature of an eye pupil central position, pupil radius, eye corner, Purkinje image formed by corneal emission and the like of the user to be recognized is extracted from the eye feature and the iris feature of specks, filaments, coronae, recesses and the like of the eyes of the user to be recognized is extracted.

If the eye feature is failed to be extracted, that is, the iris feature of the user to be recognized cannot be extracted or the eye movement feature of the user to be recognized cannot be extracted or the iris feature and eye movement feature of the user to be recognized cannot be extracted, identity recognition over the user to be recognized fails. In such case, the eye image when the user to be recognized looks at the target point position may be reacquired for identity recognition over the user to be recognized.

If the eye feature is successfully extracted, the iris feature extracted from the eye image of the user to be recognized is compared with iris features stored in the user identity information database to judge whether an iris feature consistent with the extracted iris feature of the user to be recognized exists in the user identity information database or not. If the iris feature consistent with the extracted iris feature of the user to be recognized exists, it is determined that iris recognition succeeds, the identity information and calibration data corresponding to the iris feature of the user to be recognized are called from the user identity information database and the identity information corresponding to the iris feature is determined as the identity information of the user to be recognized.

If the iris feature consistent with the extracted iris feature of the user to be recognized does not exist in the user identity information database, it is indicated that the iris feature of the user to be recognized is not stored in the user identity information database, that is, the user to be recognized is an unlicensed user, and identity recognition over the user to be recognized fails. In such case, an administrator may perform identity authentication on the user to be recognized and, after identity authentication succeeds, the iris feature and calibration data of the user to be recognized and the identity information of the user are input.

When the user to be recognized looks at the target point position, multiple eye images of the user to be recognized may be acquired. Therefore, iris recognition may be performed on the user to be recognized for many times. In a process of performing iris recognition for many times, as long as iris recognition succeeds once, it may be judged that iris recognition over the user to be recognized succeeds, that is, the identity information and calibration data corresponding to the iris feature exist in the user identity information database.

Or, q iris features may also be randomly selected from multiple iris features extracted from the acquired eye image and iris recognition is performed for q times, wherein q is smaller than the number of times for which the target point position is displayed on the display screen. In a process of performing iris recognition for q times, as long as recognition succeeds for m times, it may be judged that iris recognition over the user to be recognized succeeds, wherein m may be calculated through the following formula (1) or formula (2):

$$m=(q-1)/2 \quad (1)$$

$$m=q/2 \quad (2)$$

In the formula (1) and the formula (2), m is the number of times for which iris recognition succeeds and q is the number of times for which iris recognition is performed. In the formula (1), q is an odd number. In the formula (2), q is an even number.

In S130, living body detection is performed on the user to be recognized according to the eye image, a coordinate of the target point position, the user identity information database and an identity recognition result.

For preventing the user to be recognized from adhering counterfeiting irises to the eyes for deception, living body detection is further required to be performed on the user to be recognized in the method for recognizing identity provided in the embodiment of the disclosure.

The coordinate of the target point position is a coordinate of a target point position which is being displayed. The coordinate of the target point position may be calculated according to a relative position of the target point position and a calibration point position or another specific point position or object.

When the identity recognition result indicates that the user identity information database includes the iris feature, living body detection is performed on the user to be recognized. Living body detection over the user to be recognized specifically includes the following two conditions.

The first condition: a theoretical fixation point coordinate of the user to be recognized is calculated according to the eye movement feature and the acquired calibration data; and the theoretical fixation point coordinate is compared with the coordinate of the target point position to judge whether the user to be recognized is a living user.

A process of calculating the theoretical fixation point coordinate of the user to be recognized will be introduced below with an example in detail.

When the user looks at different target point positions, an included angle between a visual axis of the eye and an optical axis is kept unchanged. Therefore, included angle data between the visual axis and the optical axis is determined as the calibration data of the user and a pupil position, the pupil radius, the Purkinje image formed by corneal emission and the like are determined as the extracted eye movement feature of the user. The theoretical fixation point coordinate of the user to be recognized may be calculated through the eye movement feature of the pupil position, pupil radius, Purkinje image formed by corneal emission and the like of the user to be recognized and the calibration data of the included angle between the visual axis and the optical axis and the like corresponding to the iris feature of the user to be recognized. The calculated theoretical fixation point coordinate of the user to be recognized is compared with the coordinate of the target point position to judge whether a theoretical fixation point falls within area coverage of the target point position or not. The area coverage takes a preset region centered about the target point position as acceptable error area coverage. If the theoretical fixation point falls within the area coverage of the target point position and is kept for a preset time length, it is determined that recognition for the target point position succeeds. After recognition for the target point position succeeds, a next target point position may be generated on the display screen. The abovementioned method is adopted to perform fixation point recognition on the target point position appearing on the display screen, and when the user to be recognized is successfully recognized for a preset number of target point positions, it is determined that the user to be recognized is a living user. The preset number of target points refers to target points in any number more than equal to 3. A specific numerical value of the preset number is not limited in the embodiment of the disclosure.

Since multiple eye images of the user to be recognized may be continuously acquired at a certain frame rate when the user to be recognized looks at each target point, for the first condition, if a preset proportion of theoretical fixation points in theoretical fixation points calculated according to the eye images acquired within the preset time length fall within the area coverage of the target point position, it is determined that the user keeps looking at the target point position for the preset time length and recognition for the target point position succeeds. The preset time length is more than or equal to a response time of the eyes following the target point position and less than or equal to a display time of the target point position. Under a normal condition, the preset time length is more than or equal to 0.1 second. Preferably, the preset time length is 0.5-1.5 seconds. The preset proportion may be set and modified according to a recognition accuracy requirement. Under a normal condition, the preset proportion is higher than 50%. Preferably, the preset proportion is 50%-70%. A specific numerical value of the preset proportion is not limited in the embodiment of the disclosure.

The second condition: calibration data of the user to be recognized is calculated according to the eye movement feature and the coordinate of the target point position; and the calibration data of the user to be recognized is compared with the acquired calibration data to judge whether the user to be recognized is a living user.

A process of calculating the calibration data of the user to be recognized will be introduced below with an example in detail.

When the user looks at different target point positions, the included angle between the visual axis of the eye and the optical axis is kept unchanged. Therefore, the included angle data between the visual axis and the optical axis is determined as the calibration data of the user and the pupil position, the pupil radius, the Purkinje image formed by corneal emission and the like are determined as the extracted eye movement feature of the user. The target point position on the display screen is a practical fixation point coordinate of the user to be recognized and the coordinate of the target point position may be calculated according to the relative position of the target point position and the calibration point position or the other specific point or object.

The calibration data of the included angle between the visual axis and the optical axis and the like of the user to be recognized is calculated through the eye movement feature of the pupil position, pupil radius, Purkinje image formed by corneal emission and the like of the user to be recognized and the practical fixation point coordinate of the user, i.e., the coordinate of the target point position.

In the iris recognition process, the calibration data corresponding to the iris feature of the user to be recognized is called from the preestablished user identity information database, the calculated calibration data is compared with the called calibration data, and if the calculated calibration data falls within an error range of the called calibration data and is kept for the preset time length, it is considered that the user to be recognized is looking at the target point position on the display screen, that is, recognition for the target point position succeeds.

After recognition for the target point position succeeds, the next target point position may be displayed on the display screen, the abovementioned method is adopted to perform recognition on the target point position appearing on the display screen, and when the user to be recognized is successfully recognized for a preset number of target point positions, it is determined that the user to be recognized is a living user. The preset number of target points refers to target points in any number more than equal to 3. A specific numerical value of the preset number is not limited in the embodiment of the disclosure.

Since multiple eye images of the user to be recognized may be continuously acquired at a certain frame rate when the user to be recognized looks at each target point, for the second condition, if a preset proportion of calibration data in calibration data calculated according to the eye images acquired within the preset time length falls within the error range of the called calibration data, it is determined that the user keeps looking at the target point position for the preset time length and recognition for the target point position succeeds. The preset time length is more than or equal to the response time of the eyes following the target point position and less than or equal to the display time of the target point position. Under a normal condition, the preset time length is more than or equal to 0.1 second. Preferably, the preset time length is 0.5-1.5 seconds. The preset proportion may be set and modified according to the recognition accuracy requirement. Under a normal condition, the preset proportion is higher than 50%. Preferably, the preset proportion is 50%-70%. The specific numerical value of the preset proportion is not limited in the embodiment of the disclosure.

In the two conditions, the calibration data corresponding to the iris feature of the user to be recognized is called from the user identity information database to perform living body detection on the user to be recognized. Calibration data of all users may also be called from the user identity information database to perform living body detection on the user to be recognized.

When the identity recognition result indicates that the user identity information database includes the iris feature, calibration data of each user is called from the identity information database; theoretical fixation point coordinates are calculated according to the eye movement feature and the called calibration data of each user; and the theoretical fixation point coordinates are compared with the coordinate of the target point position respectively to judge whether the user to be recognized is a living user.

When the user looks at different target point positions, the included angle between the visual axis of the eye and the optical axis is kept unchanged. Therefore, the included angle data between the visual axis and the optical axis is determined as the calibration data of the user and the pupil position, the pupil radius, the Purkinje image formed by corneal emission and the like are determined as the extracted eye movement feature of the user. When the called calibration data is the calibration data, called from and stored in the user identity information database, of all the users, multiple theoretical fixation point coordinates may be calculated through the eye movement feature of the pupil position, pupil radius, Purkinje image formed by corneal emission and the like of the user to be recognized and the calibration data of an included angle between a visual axis and the optical axis and the like of each user in the preestablished user identity information database. The multiple theoretical fixation point coordinates are compared with the coordinate of the target point position respectively to judge whether a theoretical fixation point coordinate falling within the area coverage of the target point position exists in the multiple theoretical fixation point coordinates or not. The area coverage takes the preset region centered about the target point position as the acceptable error area coverage. If the theoretical fixation point exists and is kept for the preset time length, it is considered that the user to be recognized is looking at the target point position on the display screen, that is, recognition for the target point position succeeds, and meanwhile, the calibration data, called when the theoretical fixation point coordinate is calculated, of the user is determined as the calibration data of the user to be recognized. After recognition for the target point position succeeds, the next target point position may be generated on the display screen, the abovementioned method is adopted to perform recognition on the target point position appearing on the display screen, and when the user to be recognized is successfully recognized for a preset number of target point positions and the same calibration data of the user to be recognized is obtained when the user looks at the preset number of target point positions, it is determined that the user to be recognized is a living user. The preset number of target points refers to target points in any number more than equal to 3. A specific numerical value of the preset number is not limited in the embodiment of the disclosure.

Since multiple eye images of the user to be recognized may be continuously acquired at a certain frame rate when the user to be recognized looks at each target point, if a preset proportion of theoretical fixation points in theoretical fixation points calculated according to the eye images acquired within the preset time length fall within the area coverage of the target point position, it is determined that the user keeps looking at the target point position for the preset time length and recognition for the target point position succeeds. The preset time length is more than or equal to the response time of the eyes following the target point position and less than or equal to the display time of the target point position. Under a normal condition, the preset time length is more than or equal to 0.1 second. Preferably, the preset time length is 0.5-1.5 seconds. The preset proportion may be set and modified according to the recognition accuracy requirement. Under a normal condition, the preset proportion is higher than 50%. Preferably, the preset proportion is 50%-70%. The specific numerical value of the preset proportion is not limited in the embodiment of the disclosure.

When iris recognition and living body detection both succeed, it is determined that identity recognition over the user to be recognized succeeds.

If iris recognition and living body detection do not simultaneously succeed, identity recognition over the user to be recognized fails and the user is prompted that identity recognition is required to be performed again. When the number of times for which identity recognition is performed on the user to be recognized reaches a preset number of times, an identity of the user to be recognized is locked and forbidden to be continuously recognized and, in such case, it is determined that the user to be recognized is an unlicensed user. The preset number of times is 3 and may also be another numerical value. A specific numerical value of the preset number of times may be set according to a practical condition. The specific numerical value of the preset number of times is not limited in the embodiment of the disclosure.

When identity recognition over the user to be recognized succeeds, the identity information of the user and a recognition success prompt may be displayed on the display screen. Or, when identity recognition over the user to be recognized succeeds, a voice prompt may also be made to prompt that identity recognition over the user to be recognized succeeds. When identity recognition over the user to be recognized fails, an identity recognition failure and a prompt of performing identity recognition again may be displayed on the display screen. Or, when identity recognition over the user to be recognized fails, a voice prompt may also be made to prompt that identity recognition over the user to be recognized fails and second identity recognition will be performed.

If only a correspondence between the iris feature and identity information of the user is input in the preestablished user identity information database and the calibration data of the user is not input, when identity recognition is performed on the user to be recognized, it is necessary to cause the user to be recognized to look at the calibration point position on the display screen, calculate the calibration data of the user to be recognized and store the calibration data, the iris feature of the user, the identity information and a correspondence thereof in the user identity information database. A process of inputting the calibration data of the user to be recognized may be determined as a living body detection process. Living body detection may also be performed on the user to be recognized according to the eye movement feature extracted from the acquired eye image and the calibration data of the user to be recognized after the calibration data of the user to be recognized is input.

The method for recognizing identity provided in the embodiment of the disclosure includes that: the eye image when the user to be recognized looks at the target point position is acquired; identity recognition is performed on the user to be recognized according to the eye image and the preestablished user identity information database; and living body detection is performed on the user to be recognized according to the eye image, the coordinate of the target point position, the user identity information database and the identity recognition result. According to the method provided in the disclosure, the eye movement tracking technology is combined with the identity recognition technology, and when identity recognition over the user to be recognized succeeds only when living body detection and identity recognition over the user to be recognized both succeed, so that identity recognition accuracy is high and both of adaptability and anti-counterfeiting performance are high.

Embodiment 2

Figure 2:
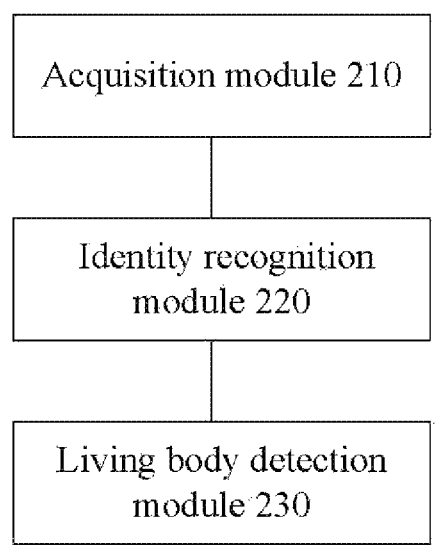
FIG. 2 is a structure diagram of an device for recognizing identity according to embodiment 2 of the disclosure.

The embodiment of the disclosure provides an device for recognizing identity. As shown in FIG. 2, the device includes:

an acquisition module 210, configured to acquire an eye image when a user to be recognized looks at a target point position;

an identity recognition module 220, configured to perform identity recognition on the user to be recognized according to the eye image and a preestablished user identity information database; and a living body detection module 230, configured to perform living body detection on the user to be recognized according to the eye image, a coordinate of the target point position, the user identity information database and an identity recognition result.

The device for recognizing identity provided in the embodiment of the disclosure may be applied to scenarios of access control of a bank, access control of a prison, payment with a password and the like. Before the method provided in the embodiment of the disclosure is adopted for identity recognition, an identity information database of licensed users of an application scenario is required to be established. For example, if the method for recognizing identity is applied to access control of the bank, an identity information database of employees of the bank is required to be established to perform identity recognition on the employees of the bank, and when the employees of the bank pass identity recognition, a door of the bank is opened and the employees can enter. If the method for recognizing identity is applied to access control of the prison, an identity information database of prison officers is required to be established.

It is to be noted herein that the acquisition module 210, the identity recognition module 220 and the living body detection module 230 may run in a computer terminal as part of the device and functions realized by the modules may be executed through a processor in the computer terminal. The computer terminal may be a terminal device such as a smart phone (for example, an Android phone and an iOS phone), a tablet computer, a palm computer, a Mobile Internet Device (MID) and a PAD.

The operation that the identity recognition module 220 performs identity recognition on the user to be recognized according to the eye image and the preestablished user identity information database is specifically implemented through an extraction unit, a first judgment unit and an acquisition unit, including that:

the extraction unit is configured to extract an eye feature from the eye image, the eye feature including an iris feature and an eye movement feature; the first judgment unit is configured to judge whether the user identity information database includes the iris feature; and the acquisition unit is configured to, under the condition that the user identity information database includes the iris feature, acquire identity information and calibration data corresponding to the iris feature from the user identity information database.

The iris feature includes, but not limited to, a feature of specks, filaments, coronae, stripes, recesses and the like. The eye movement feature includes, but not limited to an eye feature of an eye corner, pupil central position, pupil radius, Purkinje image formed by corneal emission and the like of the user.

When the user to be recognized looks at the target point position, multiple eye images of the user to be recognized may be acquired. Therefore, iris recognition may be performed on the user to be recognized for many times. In a process of performing iris recognition for many times, as long as iris recognition succeeds once, it may be judged that iris recognition over the user to be recognized succeeds, that is, the identity information and calibration data corresponding to the iris feature exist in the user identity information database.

Or, q iris features may also be randomly selected from multiple iris features extracted from the acquired eye image and iris recognition is performed for q times, wherein q is smaller than the number of times for which the target point position is displayed on the display screen. In a process of performing iris recognition for q times, as long as recognition succeeds for m times, it may be judged that iris recognition over the user to be recognized succeeds, wherein m may be calculated through the following formula (1) or formula (2):

$$m=(q-1)/2 \quad (1)$$

$$m=q/2 \quad (2)$$

In the formula (1) and the formula (2), m is the number of times for which iris recognition succeeds and q is the number of times for which iris recognition is performed. In the formula (1), q is an odd number. In the formula (2), q is an even number.

It is to be noted herein that the extraction unit, the first judgment unit and the acquisition unit may run in the computer terminal as part of the device and functions realized by the modules may be executed through the processor in the computer terminal. The computer terminal may be a terminal device such as a smart phone (for example, an Android phone and an iOS phone), a tablet computer, a palm computer, a MID and a PAD.

The operation that the living body detection module 230 performs living body detection on the user to be recognized according to the eye image, the coordinate of the target point position, the user identity information database and the identity recognition result is specifically implemented through a calculation unit and a second judgment unit, including that:

the calculation unit is configured to, when the identity recognition result indicates that the user identity information database includes the iris feature, calculate a theoretical fixation point coordinate of the user to be recognized according to the eye movement feature and the acquired calibration data; and the second judgment unit is configured to compare the theoretical fixation point coordinate with the coordinate of the target point position to judge whether the user to be recognized is a living user. The calculation unit may also be configured to, when the identity recognition result indicates that the user identity information database includes the iris feature, calculate calibration data of the user to be recognized according to the eye movement feature and the coordinate of the target point position; and the second judgment unit may also be configured to compare the calibration data of the user to be recognized with the acquired calibration data to judge whether the user to be recognized is a living user. The calculation unit may further be configured to, when the identity recognition result indicates that the user identity information database includes the iris feature, call calibration data of each user from the user identity information database and calculate theoretical fixation point coordinates according to the eye movement feature and the called calibration data of each user; and the second judgment unit may further be configured to compare the theoretical fixation point coordinates with the coordinate of the target point position respectively to judge whether the user to be recognized is a living user.

When iris recognition and living body detection both succeed, it is determined that identity recognition over the user to be recognized succeeds.

If iris recognition and living body detection do not simultaneously succeed, identity recognition over the user to be recognized fails and the user is prompted that identity recognition is required to be performed again. When the number of times for which identity recognition is performed on the user to be recognized reaches a preset number of times, an identity of the user to be recognized is locked and forbidden to be continuously recognized and, in such case, it is determined that the user to be recognized is an unlicensed user. The preset number of times is 3 and may also be another numerical value. A specific numerical value of the preset number of times may be set according to a practical condition. The specific numerical value of the preset number of times is not limited in the embodiment of the disclosure.

When identity recognition over the user to be recognized succeeds, the identity information of the user and a recognition success prompt may be displayed on the display screen. Or, when identity recognition over the user to be recognized succeeds, a voice prompt may also be made to prompt that identity recognition over the user to be recognized succeeds. When identity recognition over the user to be recognized fails, an identity recognition failure and a prompt of performing identity recognition again may be displayed on the display screen. Or, when identity recognition over the user to be recognized fails, a voice prompt may also be made to prompt that identity recognition over the user to be recognized fails and second identity recognition will be performed.

It is to be noted herein that the calculation unit and the second judgment unit may run in the computer terminal as part of the device and functions realized by the modules may be executed through the processor in the computer terminal. The computer terminal may be a terminal device such as a smart phone (for example, an Android phone and an iOS phone), a tablet computer, a palm computer, a MID and a PAD.

Before the acquisition module 210 acquires the eye image when the user to be recognized looks at the target point position, the target point position is also required to be generated on a display screen, and generation of the target point position on the display screen is specifically implemented through a first generation module or a second generation module, including that:

the first generation module is configured to randomly generate target point positions on a display screen according to a time sequence, one target point position being displayed on the display screen at every moment and the target point positions being random; or the second generation module is configured to generate the target point positions on the display screen according to the time sequence and a preset position sequence, one target point position being displayed on the display screen at every moment and the target point positions being set according to the preset position sequence.

The preset position sequence includes multiple preset position sequences. Every time when identity recognition is performed on the user to be recognized, a position sequence is randomly selected and the target point position is generated at a corresponding position on the display screen according to the randomly selected position sequence.

It is to be noted herein that the first generation module and the second generation module may run in the computer terminal as part of the device and functions realized by the modules may be executed through the processor in the computer terminal. The computer terminal may be a terminal device such as a smart phone (for example, an Android phone and an iOS phone), a tablet computer, a palm computer, a MID and a PAD.

According to the device for recognizing identity provided in the embodiment of the disclosure, an eye movement tracking technology is combined with an identity recognition technology, and identity recognition over the user to be recognized succeeds only when living body detection and identity recognition over the user to be recognized both succeed, so that identity recognition accuracy is high and both of adaptability and anti-counterfeiting performance are high.

The device for recognizing identity provided in the embodiment of the disclosure may be specific hardware on equipment or software or firmware installed on the equipment or the like. An implementation principle and achieved technical effect of the device provided in the embodiment of the disclosure are the same as those of the abovementioned method embodiment. For brief description, unmentioned parts of the device embodiment may refer to the corresponding contents in the method embodiment. Those skilled in the art may clearly know that specific working process of the system, device and units described above may refer to corresponding processes in the method embodiment and, for convenient and brief description, will not be elaborated herein.

Embodiment 3

The embodiment of the disclosure provides a storage medium, which includes a stored program, the program running to control a device where the storage medium is located to execute the abovementioned method for recognizing identity.

Embodiment 4

The embodiment of the disclosure provides a processor, which is configured to run a program, the program running to execute the abovementioned method for recognizing identity.

Embodiment 5

The embodiment of the disclosure provides a terminal, which includes: an acquisition module, configured to acquire an eye image when a user to be recognized looks at a target point position; an identity recognition module, configured to perform identity recognition on the user to be recognized according to the eye image and a preestablished user identity information database; a living body detection module, configured to perform living body detection on the user to be recognized according to the eye image, a coordinate of the target point position, the user identity information database and an identity recognition result; and a processor, running a program, the program running to execute the abovementioned method for recognizing identity for data output from the acquisition module, the identity recognition module and the living body detection module.

Embodiment 6

The embodiment of the disclosure provides a terminal, which includes: an acquisition module, configured to acquire an eye image when a user to be recognized looks at a target point position; an identity recognition module, configured to perform identity recognition on the user to be recognized according to the eye image and a preestablished user identity information database; a living body detection module, configured to perform living body detection on the user to be recognized according to the eye image, a coordinate of the target point position, the user identity information database and an identity recognition result; and a storage medium, configured to store a program, the program running to execute the abovementioned method for recognizing identity for data output from the acquisition module, the identity recognition module and the living body detection module.

Each functional unit provided in the embodiments of the application may run in a mobile terminal, a computer terminal or a similar arithmetic unit and may also be stored as part of a storage medium.

Therefore, an embodiment of the disclosure may provide a computer terminal. The computer terminal may be any computer terminal device in a computer terminal a computer terminal group. Optionally, in the embodiment, the computer terminal may also be replaced with a terminal device such as a mobile terminal.

Optionally, in the embodiment, the computer terminal may be located in at least one network device in multiple network devices of a computer network.

In the embodiment, the computer terminal may execute a program code of the following steps in a method for recognizing identity: an eye image when a user to be recognized looks at a target point position is acquired; identity recognition is performed on the user to be recognized according to the eye image and a preestablished user identity information database; and living body detection is performed on the user to be recognized according to the eye image, a coordinate of the target point position, the user identity information database and an identity recognition result.

Optionally, the computer terminal may include one or more processors, a memory and a transmission device.

The memory may be configured to store a software program and a module, for example, a program instruction/module corresponding to a method for recognizing identity and device in the embodiment of the disclosure. The processor runs the software program and module stored in the memory, thereby executing various types of functional applications and data processing, namely implementing the method for recognizing identity. The memory may include a high-speed Random Access Memory (RAM), and may further include a non-volatile memory, for example, one or more magnetic storage devices, flash memories or other non-volatile solid-state memories. In some examples, the memory may further include memories arranged remotely relative to the processor, and these remote memories may be connected to the computer terminal through a network. An example of the network includes, but not limited to, the Internet, an intranet of an enterprise, a local area network, a mobile communication network or a combination thereof.

The transmission device is configured to receive or send data through a network. A specific example of the network may include a wired network and a wireless network. In an example, the transmission device includes a Network Interface Controller (NIC), which may be connected with another network device and a router through a network cable, thereby communicating with the Internet or the local area network. In an example, the transmission device is a Radio Frequency (RF) module, which is configured to communicate with the Internet in a wireless manner.

Specifically, the memory is configured to store a preset action condition, preset information of a licensed user and an application program.

The processor may call the information and application program stored in the memory through the transmission device and execute the program code of method steps in each optional or preferred embodiment in the method embodiments.

Those of ordinary skill in the art may know that the computer terminal may also be a terminal device such as a smart phone (for example, an Android phone and an iOS phone), a tablet computer, a palm computer, a MID and a PAD.

Those of ordinary skill in the art may know that all or part of the steps of each method of the embodiment may be implemented by instructing related hardware of a terminal device through a program, the program may be stored in a computer-readable storage medium, and the storage medium may include: a flash disk, a Read-Only Memory (ROM), a RAM, a magnetic disk or an optical disk.

An embodiment of the disclosure further provides a storage medium. Optionally, in the embodiment, the storage medium may be configured to store a program code executed by a method for recognizing identity provided in the method embodiment and the device embodiment.

Optionally, in the embodiment, the storage medium may be located in any computer terminal in a computer terminal group in a computer network or is located in any mobile terminal in a mobile terminal group.

Optionally, in the embodiment, the storage medium may be configured to store a program code configured to execute the following steps: an eye image when a user to be recognized looks at a target point position is acquired; identity recognition is performed on the user to be recognized according to the eye image and a preestablished user identity information database; and living body detection is performed on the user to be recognized according to the eye image, a coordinate of the target point position, the user identity information database and an identity recognition result.

Optionally, in the embodiment, the storage medium may further be configured to store the program code of method steps in each preferred or optional method step provided by the method for recognizing identity.

The method for recognizing identity and device according to the disclosure are described above with examples with reference to the drawings. However, those skilled in the art should know that various improvements may also be made to the method for recognizing identity and device disclosed in the disclosure without departing from the contents of the disclosure. Therefore, the scope of protection of the disclosure shall be determined by contents of the appended claims.

In some embodiments provided in the disclosure, it is to be understood that the disclosed device and method may be implemented in another manner. The device embodiment described above is only schematic. For example, division of the units is only logic function division, and other division manners may be adopted during practical implementation. For another example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed on multiple network units. Part or all of the units may be selected to achieve the purpose of the solutions of the embodiments according to a practical requirement.

In addition, each functional unit in the embodiments provided in the disclosure may be integrated into a processing unit, each unit may also physically exist independently, and two or more than two unit may also be integrated into a unit.

When being realized in form of software functional unit and sold or used as an independent product, the function may be stored in a computer-readable storage medium. Based on such an understanding, the technical solutions of the disclosure substantially or parts making contributions to a conventional art or part of the technical solutions may be embodied in form of software product, and the computer software product is stored in a storage medium, including a plurality of instructions configured to enable a computer device (which may be a personal computer, a server, a network device or the like) to execute all or part of steps of the method in each embodiment of the disclosure. The storage medium includes: various media capable of storing program codes such as a mobile storage device, a ROM, a RAM, a magnetic disk or an optical disk.

It is to be noted that similar reference signs and letters represent similar items in the following drawings and thus, once a certain item is defined in a drawing, it is not required to be further defined and explained in the following drawings. In addition, terms "first", "second", "third" and the like are only adopted for distinctive description and should not be understood to indicate or imply relative importance.

It is finally to be noted that the above embodiments are only specific implementation modes of the disclosure and are adopted not to limit but to describe the technical solutions of the disclosure. The scope of protection of the disclosure is not limited thereto. Although the disclosure has been described with reference to the abovementioned embodiments in detail, those of ordinary skill in the art should know that those skilled in the art may still make modifications or apparent variations to the technical solutions recorded in the abovementioned embodiments or make equivalent replacements to part of technical features therein within the technical scope disclosed in the disclosure. These modifications, variations or replacements do not make the essences of the corresponding technical solutions depart from the spirit and scope of the technical solutions of the embodiments of the disclosure and shall all fall within the scope of protection of the disclosure. Therefore, the scope of protection of the disclosure shall be subject to the scope of protection of the claims.

What is claimed is:

1. A method for recognizing identity, comprising:
    acquiring an eye image when a user to be recognized looks at a target point position;
    performing identity recognition on the user to be recognized according to the eye image and a preestablished user identity information database; and
    performing living body detection on the user to be recognized according to the eye image, a coordinate of the target point position, the user identity information database and an identity recognition result;
    wherein performing identity recognition on the user to be recognized according to the eye image and the preestablished user identity information database comprises: extracting an eye feature from the eye image, the eye feature comprising an iris feature and an eye movement feature; judging whether the user identity information database comprises the iris feature; and if the user identity information database comprises the iris feature, acquiring identity information and calibration data corresponding to the iris feature from the user identity information database;
    wherein performing living body detection on the user to be recognized according to the eye image, the coordinate of the target point position, the user identity information database and the identity recognition result comprises: when the identity recognition result indicates that the user identity information database comprises the iris feature, calculating a theoretical fixation point coordinate of the user to be recognized according to the eye movement feature and the acquired calibration data; and comparing the theoretical fixation point coordinate with the coordinate of the target point position to judge whether the user to be recognized is a living user.

2. The method as claimed in claim 1, wherein performing living body detection on the user to be recognized according to the eye image, the coordinate of the target point position, the user identity information database and the identity recognition result comprises: when the identity recognition result indicates that the user identity information database comprises the iris feature, calculating calibration data of the user to be recognized according to the eye movement feature and the coordinate of the target point position; and comparing the calibration data of the user to be recognized with the acquired calibration data to judge whether the user to be recognized is a living user.

3. The method as claimed in claim 1, wherein performing living body detection on the user to be recognized according to the eye image, the coordinate of the target point position, the user identity information database and the identity recognition result comprises: when the identity recognition result indicates that the user identity information database comprises the iris feature, calling calibration data of each user from the user identity information database; calculating theoretical fixation point coordinates according to the eye movement feature and the called calibration data of each user; and comparing the theoretical fixation point coordinates with the coordinate of the target point position respectively to judge whether the user to be recognized is a living user.

4. The method as claimed in claim 1, before acquiring the eye image when the user to be recognized looks at the target point position, further comprising:
    randomly generating target point positions on a display screen according to a time sequence, one target point position being displayed on the display screen at every moment and the target point positions being random;
    or, generating the target point positions on the display screen according to the time sequence and a preset position sequence, one target point position being displayed on the display screen at every moment and the target point positions being set according to the preset position sequence.

5. A device for recognizing identity, the device has a processor coupled with a memory, and the processor configured to execute the following programming instructions stored in the memory:
    acquiring an eye image when a user to be recognized looks at a target point position;
    performing identity recognition on the user to be recognized according to the eye image and a preestablished user identity information database; and
    performing living body detection on the user to be recognized according to the eye image, a coordinate of the target point position, the user identity information database and an identity recognition result;
    wherein performing identity recognition on the user to be recognized according to the eye image and a preestablished user identity information database comprises: extracting an eye feature from the eye image, the eye feature comprising an iris feature and an eye movement feature; a first judgment unit, configured to judge whether the user identity information database comprises the iris feature; and under the condition that the user identity information database comprises the iris feature, acquiring identity information and calibration data corresponding to the iris feature from the user identity information database;
    wherein performing living body detection on the user to be recognized according to the eye image, the coordinate of the target point position, the user identity information database and the identity recognition result comprises: when the identity recognition result indicates that the user identity information database comprises the iris feature, calculating a theoretical fixation point coordinate of the user to be recognized according to the eye movement feature and the acquired calibration data; and comparing the theoretical fixation point coordinate with the coordinate of the target point position to judge whether the user to be recognized is a living user.

6. The device as claimed in claim 5, wherein performing living body detection on the user to be recognized according to the eye image, the coordinate of the target point position, the user identity information database and the identity recognition result comprises: when the identity recognition result indicates that the user identity information database comprises the iris feature, calculating calibration data of the user to be recognized according to the eye movement feature and the coordinate of the target point position; and comparing the calibration data of the user to be recognized with the acquired calibration data to judge whether the user to be recognized is a living user.

7. The device as claimed in claim 5, wherein performing living body detection on the user to be recognized according to the eye image, the coordinate of the target point position, the user identity information database and the identity recognition result comprises: when the identity recognition result indicates that the user identity information database comprises the iris feature, calling calibration data of each user from the user identity information database and calculating theoretical fixation point coordinates according to the eye movement feature and the called calibration data of each user; and comparing the theoretical fixation point coordinates with the coordinate of the target point position respectively to judge whether the user to be recognized is a living user.

8. The device as claimed in claim 5, before acquiring the eye image when the user to be recognized looks at the target point position, further comprising:
    randomly generating target point positions on a display screen according to a time sequence, one target point position being displayed on the display screen at every moment and the target point positions being random;
    or, generating the target point positions on the display screen according to the time sequence and a preset position sequence, one target point position being displayed on the display screen at every moment and the target point positions being set according to the preset position sequence.

9. A terminal, comprising a processor coupled with a memory, and the processor configured to execute the following programming instructions stored in the memory:
    acquiring an eye image when a user to be recognized looks at a target point position;
    performing identity recognition on the user to be recognized according to the eye image and a preestablished user identity information database;
    performing living body detection on the user to be recognized according to the eye image, a coordinate of the target point position, the user identity information database and an identity recognition result; and
    running a program, the program running to execute the method for recognizing identity as claimed in claim 1 for data output from the acquisition module, the identity recognition module and the living body detection module.

10. The device as claimed in claim 9, the program also runs to execute the following function:
    extracting an eye feature from the eye image, the eye feature comprising an iris feature and an eye movement feature;
    judging whether the user identity information database comprises the iris feature; and
    if the user identity information database comprises the iris feature, acquiring identity information and calibration data corresponding to the iris feature from the user identity information database.

11. The device as claimed in claim 10, the program also runs to execute the following function:
    when the identity recognition result indicates that the user identity information database comprises the iris feature, calculating a theoretical fixation point coordinate of the user to be recognized according to the eye movement feature and the acquired calibration data; and
    comparing the theoretical fixation point coordinate with the coordinate of the target point position to judge whether the user to be recognized is a living user.

12. The device as claimed in claim 10, the program also runs to execute the following function:
    when the identity recognition result indicates that the user identity information database comprises the iris feature, calculating calibration data of the user to be recognized according to the eye movement feature and the coordinate of the target point position; and
    comparing the calibration data of the user to be recognized with the acquired calibration data to judge whether the user to be recognized is a living user.

13. The device as claimed in claim 10, the program also runs to execute the following function:
    when the identity recognition result indicates that the user identity information database comprises the iris feature, calling calibration data of each user from the user identity information database;
    calculating theoretical fixation point coordinates according to the eye movement feature and the called calibration data of each user; and
    comparing the theoretical fixation point coordinates with the coordinate of the target point position respectively to judge whether the user to be recognized is a living user.

14. The device as claimed in claim 9, the program also runs to execute the following function:
    randomly generating target point positions on a display screen according to a time sequence, one target point position being displayed on the display screen at every moment and the target point positions being random;
    or, generating the target point positions on the display screen according to the time sequence and a preset position sequence, one target point position being displayed on the display screen at every moment and the target point positions being set according to the preset position sequence.

* * * * *